(12) United States Patent
Saunders et al.

(10) Patent No.: US 8,716,627 B2
(45) Date of Patent: May 6, 2014

(54) WELDING SYSTEMS AND METHODS

(75) Inventors: Jack Saunders, Fountain Hills, AZ (US); Robert Hogan, Chandler, AZ (US); Surendra Singh, Chandler, AZ (US); Andy Kinney, Chandler, AZ (US); Randal Easterwood, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 560 days.

(21) Appl. No.: 12/879,783

(22) Filed: Sep. 10, 2010

(65) Prior Publication Data
US 2012/0061363 A1   Mar. 15, 2012

(51) Int. Cl.
*B23K 9/00* (2006.01)
(52) U.S. Cl.
USPC ............................................. 219/136
(58) Field of Classification Search
USPC .................. 219/136, 124, 124.34, 137 R, 98; 324/121.63; 73/61.56
See application file for complete search history.

(56) References Cited

U.S. PATENT DOCUMENTS

| | | | |
|---|---|---|---|
| 4,164,640 A | | 8/1979 | Scheffels |
| 4,203,021 A | | 5/1980 | Anderl et al. |
| 4,495,587 A | | 1/1985 | Plante et al. |
| 4,830,261 A | | 5/1989 | Mello et al. |
| 4,988,201 A | * | 1/1991 | Sugitani et al. ............... 356/601 |
| 5,045,668 A | | 9/1991 | Neiheisel et al. |
| 5,463,201 A | * | 10/1995 | Hedengren et al. ...... 219/121.83 |
| 5,877,960 A | * | 3/1999 | Gross et al. .................... 700/175 |
| 5,925,268 A | | 7/1999 | Britnell |
| 6,437,281 B1 | * | 8/2002 | Zhang et al. ............. 219/121.45 |
| 6,998,569 B2 | | 2/2006 | Schumacher |
| 7,015,690 B2 | | 3/2006 | Wang et al. |
| 7,094,989 B2 | | 8/2006 | McJunkin et al. |
| 7,289,913 B2 | | 10/2007 | Schlicker et al. |
| 7,577,285 B2 | | 8/2009 | Schwarz et al. |
| 2005/0224477 A1 | * | 10/2005 | McJunkin et al. ....... 219/124.34 |
| 2008/0073409 A1 | | 3/2008 | Ostersehlte |

OTHER PUBLICATIONS

Anonymous: "Method for monitoring the laser-welding process of metals by using an eddy-current sensor", Research Disclosure, Mason Publications, Hampshire, GB, vol. 452, No. 75, Dec. 1, 2001.
EP Search Report for EP 11 180 644.4 dated Jan. 30, 2013.
EP Communication for EP 11 180 644.4 dated Feb. 11, 2013.

\* cited by examiner

*Primary Examiner* — Dana Ross
*Assistant Examiner* — Renee L Miller
(74) *Attorney, Agent, or Firm* — Ingrassia Fisher & Lorenz, P.C.

(57) ABSTRACT

A welding system is provided for welding a first work piece to a second work piece at a joint having a weld face and a root face. The welding system includes a weld face sensor configured to determine first joint characteristics at the weld face; a root face sensor configured to determine second joint characteristics at the root face; a controller coupled to the weld face sensor and the root face sensor and configured to generate positioning signals based on the first joint characteristics and the second joint characteristics; and a welding gun coupled to the controller and positioned proximate to the weld face, the welding gun configured to generate a welding beam for welding the joint based on the positioning signals from the controller.

17 Claims, 4 Drawing Sheets

WELDING SYSTEMS AND METHODS

TECHNICAL FIELD

The present invention generally relates to welding systems and methods, and more particularly relates to welding systems and methods for tracking a joint between two or more work pieces to be welded.

BACKGROUND

High energy beam welding, such as laser beam or electron beam welding, is used to join one work piece to another work piece by directing a highly focused beam of energy into a joint between the work pieces to heat and fuse them together. One common type of welding joint is a butt joint in which an edge portion of one work piece is placed in abutting fashion generally against an edge portion of another work piece before welding the edges together.

Exact positioning of the welding beam relative to the joint is essential for a high-quality weld, particularly as the welding beam travels along the joint during the welding process. As examples of imprecise positioning, the welding beam may be laterally offset with the joint, at an incorrect angle relative to the joint, or at an incorrect beam width. Imprecise positioning of the welding beam may result in an unsatisfactory weld, and the quality of the weld may impact many aspects of the completed part, including the microstructure, microhardness, tensile properties, formability, fatigue strength, fracture toughness, and the overall value of the joining process.

There have been substantial efforts to develop practical and reliable automated devices for tracking the joint and moving the welding beam along a prescribed path of travel corresponding to the path of the welding joint. One approach for the tracking of the joint to be welded is the use of contacting probes. Such systems generally utilize the physical characteristics of the work pieces and the joint as a mechanical guide for a sliding or rolling mechanism to which the welding gun is linked. These systems, however, often lose contact with the joint, which can interrupt the operation of the tracking device and compromise the weld quality. Accordingly, use of various non-contacting sensors have been attempted to provide more information about the weld joint. A non-contacting sensor, such as an optical imaging sensor, may be able to repeatedly scan the joint to be welded to provide a map of joint geometry. However, optical imaging may be sensitive to the level of ambient light and smoke emitted by the welding process, and subjective evaluations of the visual image to be tracked may also be an issue. An additional problem with many tracking devices includes the difficulty of positioning the sensors at inaccessible portions of the joint.

Accordingly, it is desirable to provide welding systems and methods with more accurate joint tracking and beam positioning. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a welding system is provided for welding a first work piece to a second work piece at a joint having a weld face and a root face. The welding system includes a weld face sensor configured to determine first joint characteristics at the weld face; a root face sensor configured to determine second joint characteristics at the root face; a controller coupled to the weld face sensor and the root face sensor and configured to generate positioning signals based on the first joint characteristics and the second joint characteristics; and a welding gun coupled to the controller and positioned proximate to the weld face, the welding gun configured to generate a welding beam for welding the joint based on the positioning signals from the controller.

In accordance with another exemplary embodiment, a system is provided for tracking a joint extending from first faces of work pieces to second faces of the work pieces. The system includes first sensor configured to generate first joint characteristics of the joint at the first faces; a second sensor configured to generate second joint characteristics of the joint at the second faces; and an encoder coupled to the first sensor and the second sensor and configured to determine a joint position based on the first joint characteristics and the second joint characteristics.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein are directed to welding systems and methods for welding a joint between first and second work pieces. The welding system includes a sensor system and a beam system. A weld face sensor of the sensor system tracks the joint at the weld face and a root sensor tracks the joint at the root face such that the sensor system provides more accurate indications of joint geometry, and thus, an improved weld during the subsequent welding process.

Figure 1:
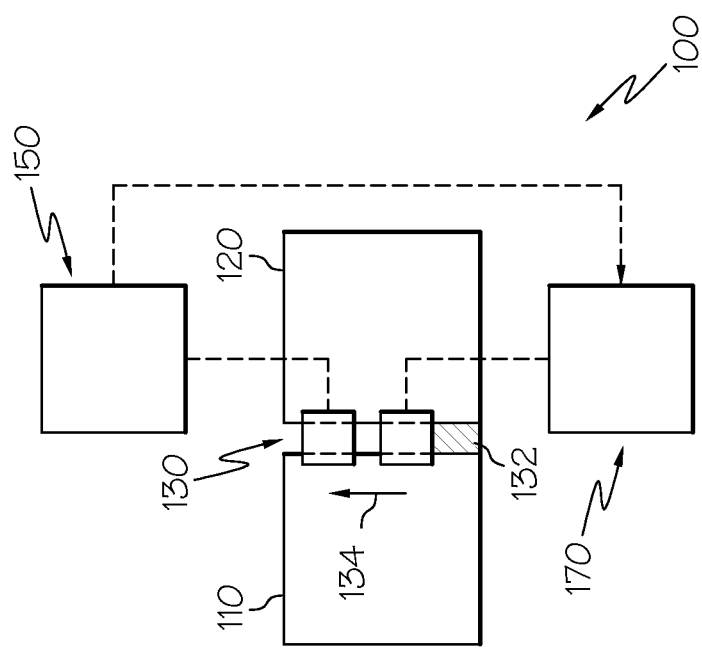
FIG. 1 is a top schematic view of welding system in accordance with an exemplary embodiment.
Figure 1:
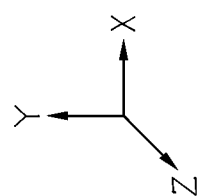

FIG. 1 is a top schematic view of welding system 100 in accordance with an exemplary embodiment for welding a first work piece 110 to a second work piece 120. The welding system 100 includes a sensor system 150 that tracks the geometry of a joint 130 between the first and second work pieces 110, 120. In the view of FIG. 1, the sensor system 150 tracks the joint 130 generally in the y-direction, as indicated by arrow 134, although the sensor system 150 may also note variations of the joint 130 in the x- and z-directions. A beam system 170 follows the sensor system 150 and generates a high energy beam absorbed by portions of the work pieces 110, 120 at the joint 130 that melt to form a weld 132. The sensor system 150 and beam system 170 are discussed in greater detail below.

Figure 2:
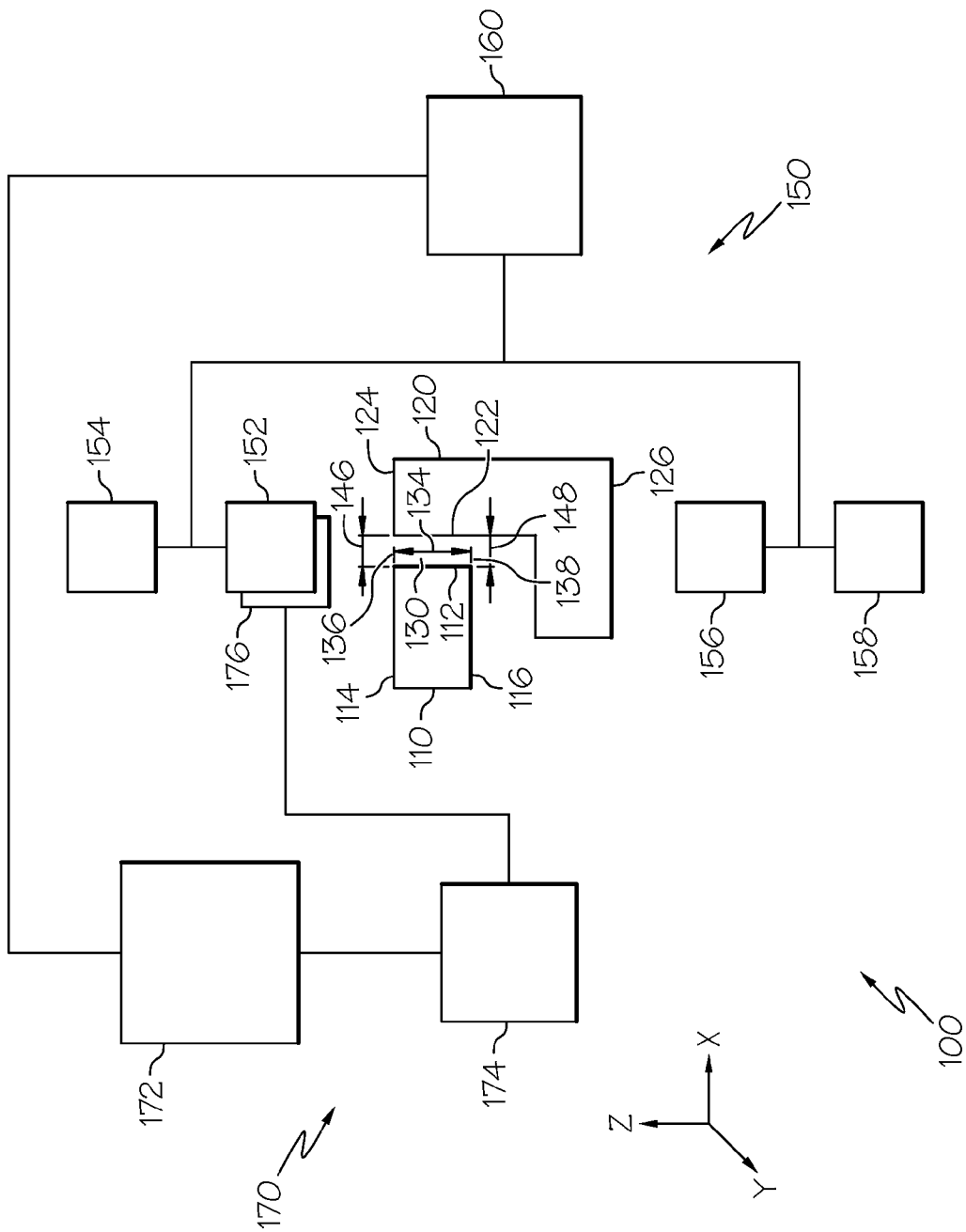
FIG. 2 is a side schematic view of the welding system of FIG. 1 in accordance with an exemplary embodiment.

FIG. 2 is a side schematic view that illustrates the welding system 100 of FIG. 1 in greater detail. As noted above, the welding system 100 welds the joint 130 between the first work piece 110 and the second work piece 120. Generally, the joint 130 is defined by respective edges 112, 122 of the first and second work pieces 110, 120 and extends to a depth 134 in a z-direction and along a path further defined in x- and y-directions. Each of the work pieces 110, 120 have upper surfaces 114, 124 and lower surfaces 116, 126 relative to the view of FIG. 2. The areas of the joint 130 proximate to the upper surfaces 114, 124 may be referred to as a weld face 136, and the areas of the joint 130 proximate to the lower surfaces 116, 126 may be referred to as a root face 138. As discussed in greater detail below, the joint 130 at the weld face 136 is defined by a weld face thickness 146, and the joint 130 at the root face 138 is defined by a root face thickness 148.

The relative position of the first and second work pieces 110, 120 in FIGS. 1 and 2 is generally referred to as a butt weld in that the abutting edges 112, 122 of the work pieces 110, 120 are to be welded together. In the depicted embodiment, the weld face thickness 146 is approximately equal to the root face thickness 148 and the edges 112, 122 are generally perpendicular to the upper surfaces 114, 124 of the work pieces 110, 120 to form a constant right angle butt weld. However, as will be discussed in greater detail below, the welding system 100 may also be utilized on tapered joints in which the weld face thickness 146 is different than the root face thickness 148, joints in which both edges 112, 122 are angled, and/or other geometries, including fully penetrated groove welds, fillet welds, angle welds, and other type of welds.

As noted above, the welding system 100 generally includes the sensor system 150 and the beam system 170. The sensor system 150 includes a weld face sensor 152, a weld face driver 154, a root face sensor 156, a root face driver 158, and an encoder 160. The beam system 170 includes a controller 172, a welding support 174, and a welding gun 176.

The welding gun 176 is positioned proximate to the joint 130 by the welding support 174. The welding support 174 is additionally capable of translating the welding gun 176 along the joint 130, generally in one or more of the x-, y-, and z-directions. The welding support 174 may also orient the welding gun 176 at any angle. Any suitable rail, track, robot, motors, or the like may form part of the welding support 174 to manipulate the welding gun 176.

The welding gun 176 is generally operable to weld the opposing edges 112, 122 by directing a focused energy beam onto the work pieces 110, 120 and heating the opposing edges 112, 122 such that the edges 112, 122 at the work pieces 110, 120 melt together and bridge the gap of the joint 130. The welding gun 176 may produce, for example, a laser beam or an electron beam at a power sufficient to weld the work pieces 110, 120. If the source of high energy density radiation is a laser, it may be a $CO_2$ laser, a CO laser, an excimer laser, another type of gas laser, or a solid state laser such as a YAG laser that operates in continuous wave mode, pulse mode, modulated mode, rippled mode, or another type of operating mode. A focusing mirror (not shown) or other optical elements may be provided to ensure desired beam positioning. Other types of thermal energy beams may also be provided. As discussed in greater detail below, it is generally desirable for the welding gun 176 to produce a beam aligned with a central axis of the joint 130 and with a width that encompasses the greatest thickness of the joint 130, i.e., the greater of the weld face thickness 146 and the root face thickness 148. As also described below, the sensor system 150 functions to provide information used to optimally position the welding gun 176 in this manner.

As noted above, the sensor system 150 includes the weld face sensor 152 and the root face sensor 156. Relative to the first and second work pieces 110, 120, the weld face sensor 152 is positioned proximate to the weld face 136 to measure joint characteristic, including the position of the joint 130 at the weld face 136 in the xy-plane as well as the thickness 146. The weld face driver 154 generally includes a support (not shown) and a motor (not shown) configured to move the weld face sensor 152 along the weld face 136. As such, the weld face driver 154 may position the weld face sensor 152 in the x-, y-, and z-directions relative to the work pieces 110, 120. Similarly, the root face sensor 156 is positioned proximate to the root face 138 to measure joint characteristic, including the position of the joint 130 at the root face 138 in the xy-plane as well as the thickness 148. The root face driver 158 generally includes a support (not shown) and a motor (not shown) configured to move the root face sensor 156 along the root face 138 in any of the x-, y-, and z-directions.

The sensors 152, 156 may be eddy current sensors that provide the sensitivity and resolution required for the continuous and precise tracking of the joint 130 with any geometry. For example, the sensors 152, 156 may respectively include drive coils carrying currents that generate a primary magnetic field, which in turn, induces eddy currents in the work pieces 110, 120 to generate a secondary magnetic field. Discontinuities in the work pieces 110, 120, such as the joint 130, alter the eddy current flow and the orientation of the secondary magnetic field, which are sensed by sensing coils in the sensors 152, 156 to generate deviation signals. Accordingly, the sensors 152, 156 are omni-directional with respect to the joint 130. The encoder 160 coupled to the sensors 152, 156 uses these deviation signals and the position of the sensors 152, 156 to determine the geometry of the joint 130. As the sensors 152, 156 scan the work pieces 110, 120, the weld face sensor 152 tracks the position of the joint 130 at the weld face 136 and the weld face thickness 146, and the root face sensor 156 tracks the position of the joint 130 at the root face 138 and the root face thickness 148.

The encoder 160 provides information defining the position of the joint 130 at the weld face 136, the position of the joint 130 at the root face 138, the weld face thickness 146, and the root face thickness 148 to the welding controller 172. Other aspects of joint geometry information may also be provided. In response to joint geometry provided by the encoder 160, the controller 172 plots a path and operating parameters of the welding gun 176. The path may include the necessary movements of the welding gun 176 along the joint 130 in one or more of the x-, y-, and z-directions. The operating parameters may include the angle of the welding gun 176, beam characteristics, and timing information. The controller 172 evaluates joint geometry, determines the appropriate sequence of welding instructions (or positioning signals), and provides such instructions to the welding support 174 for execution at the welding gun 176. As described above, the welding gun 176 welds the joint 130 according to these instructions to provide a high quality weld at the joint 130 to join the first and second work pieces 110, 120. In one exemplary embodiment, the sensor system 150 maps the entire joint 130 prior to execution by the beam system 170, while in other embodiments, the beam system 170 follows the sensor system 150 to track and weld the joint 130 in real time. Additionally, the embodiments discussed above include a movable welding support 174 for adjusting the position of the welding gun 176 and drivers 154, 158 for adjusting the positions of the sensors 152, 156; however, in other embodiments, the welding gun 176 and sensors 152, 156 may be stationary, and the controller 172 may be coupled to a motor and support system that move the work pieces 110, 120 relative to the sensors 152, 156 and welding gun 176.

As shown in the view of FIG. 2, the root face 138 is inaccessible to visual inspection due to the geometry of the second work piece 120. Inaccessible root faces are common occurrences in welding operations. Many conventional welding systems do not consider the geometry of the root face at all, but even those that do are not able accurately to track the joint at the root face in such situations. However, the eddy current sensor 156 of the welding system 100 at the root face 138 is able to evaluate the root face geometry regardless of visual accessibility to result in a high quality weld in any situation. Other sensors may include laser, ultrasound, air coupled ultrasound, and electromagnetic acoustic transducers.

Figure 3:
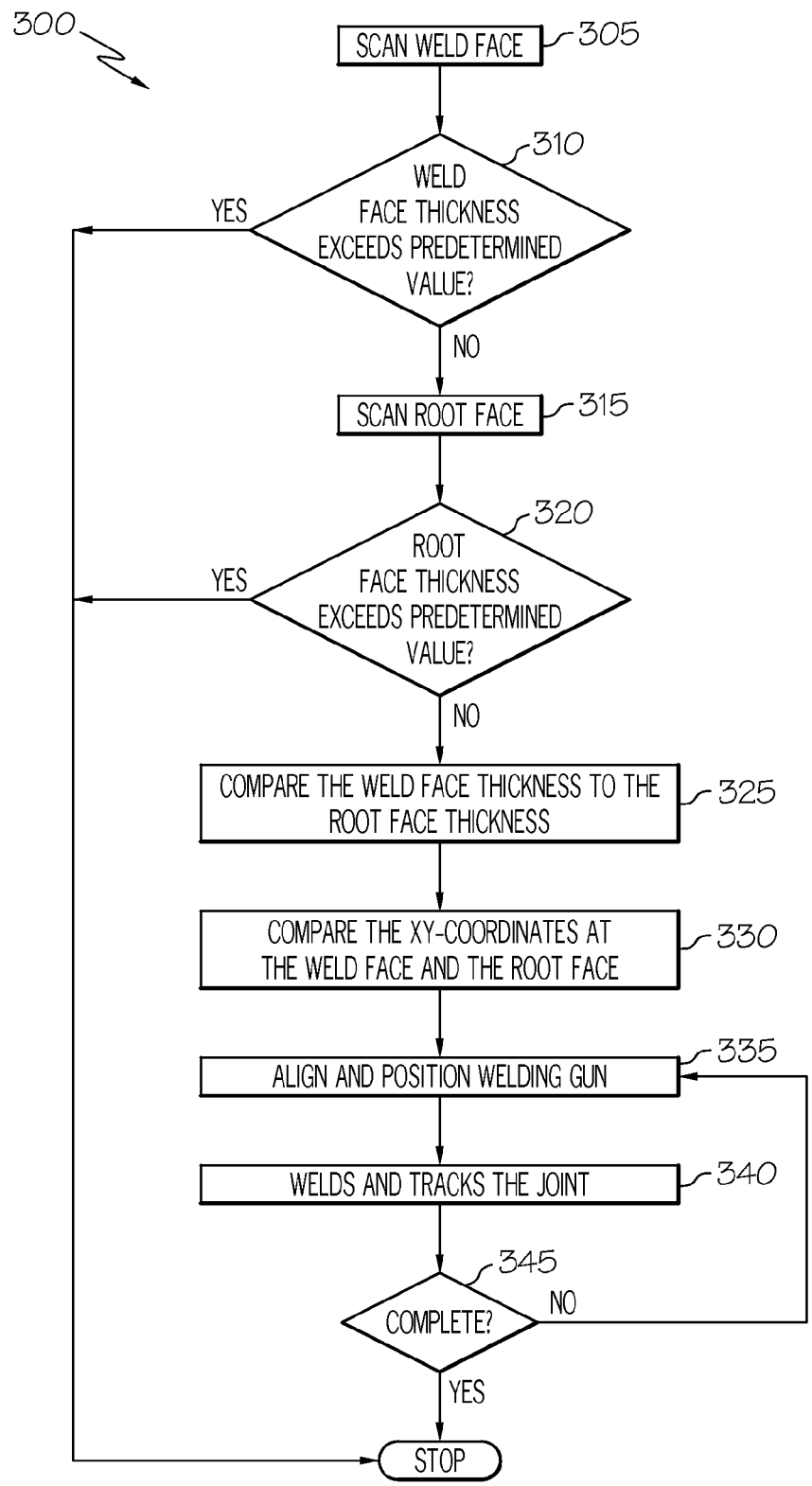
FIG. 3 is a flow chart depicting a welding method in accordance with an exemplary embodiment.

FIG. 3 is a flow chart depicting a welding method 300 in accordance with an exemplary embodiment. The method 300 may be used with the system 100 discussed above. As such, additional reference is made to FIGS. 1 and 2.

In a first step 305, the weld face sensor 152 scans the joint 130 at the weld face 136 to determine the position of the joint 130 at the weld face 136 as well as the weld face thickness 146. In a second step 310, the controller 172 determines if the weld face thickness 146 exceeds a predetermined value. If the weld face thickness 146 is greater than a predetermined value, the method 300 is stopped and the work pieces 110, 120 are rejected, the joint 130 is prepared with additional material such that the joint 130 is suitable for welding, and/or the beam width is increased to accommodate the weld face thickness 146. If the weld face thickness 146 is not greater than the predetermined value, the method 300 proceeds to step 315 in which the root face sensor 156 scans the joint 130 at the root face 138 to determine the position of the joint 130 at the root face 138 as well as the root face thickness 148. In a step 320, the controller 172 determines if the root face thickness 148 exceeds a predetermined value. If the root face thickness 148 is greater than a predetermined value, the method 300 is stopped and the work pieces 110, 120 are rejected and/or the joint 130 is prepared with additional material such that the joint 130 is suitable for welding. If the root face thickness 148 is not greater than the predetermined value, the method 300 proceeds to step 325 in which the controller 172 compares the weld face thickness 146 to the root face thickness 148 to determine the taper, if applicable, of the joint 130. If the weld face thickness 146 and the root face thickness 148 are not equal, the joint 130 is tapered. In a step 330, the controller 172 compares the xy-coordinates of the joint 130 at the weld face 136 and the root face 138 to determine if the joint 130 is angled. For example, for any given z-axis, the joint 130 may have matching xy-coordinates on the weld face 136 and the root face 138, which indicates that the joint 130 is not angled. Conversely, if the joint 130 does not have matching xy-coordinates on the weld face 136 and the root face 138 for a given z-axis, the joint 130 is angled. In step 335, the welding gun 176 is properly aligned and positioned according to the taper characteristics and the angle of the joint 130, and in step 340, the welding gun 176 welds and tracks the joint with consideration for the position, angle, and taper of the joint 130 to result in a suitable weld between the first and second work pieces 110, 120. In step 345, the controller 172 determines when the weld is complete. If the weld is complete, the method 300 stops. If the weld is not complete, the method 300 returns to step 335 in one exemplary embodiment. In other embodiments, the method 300 may return to step 305 depending on whether the method 300 determines and tracks the entire joint 130 or the method 300 determines and tracks the joint 130 in iterations or in real-time.

Figure 4:
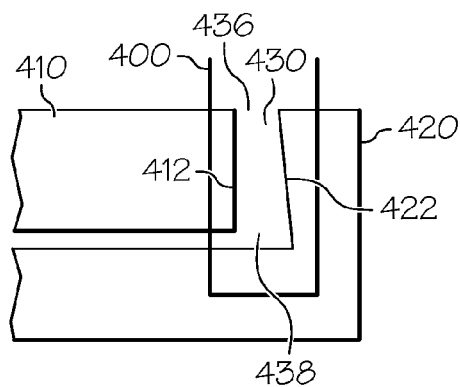
FIG. 4 is an exemplary weld associated with the welding system of FIGS. 1 and 2 in accordance with an exemplary embodiment.
Figure 5:
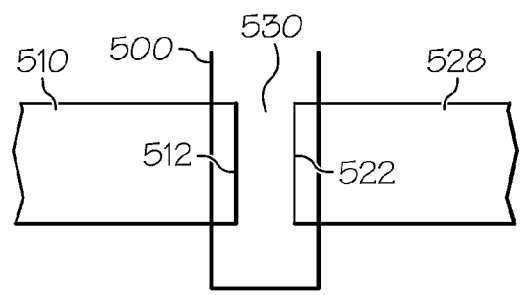
FIG. 5 is an exemplary weld associated with the welding system of FIGS. 1 and 2 in accordance with another exemplary embodiment.
Figure 6:
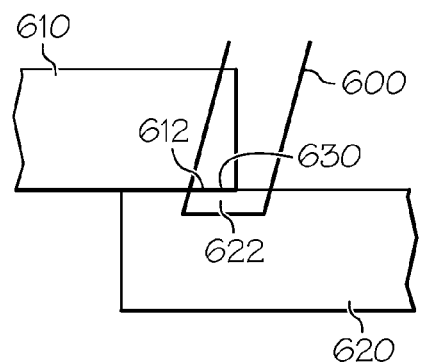
FIG. 6 is an exemplary weld associated with the welding system of FIGS. 1 and 2 in accordance with another exemplary embodiment.
Figure 7:
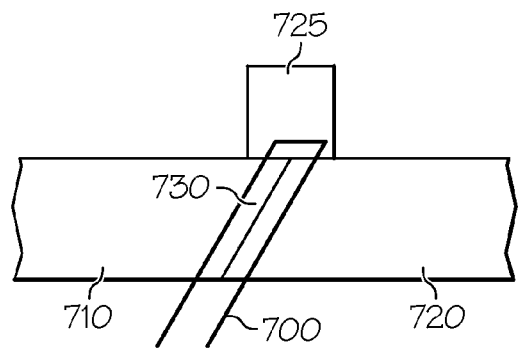
FIG. 7 is an exemplary weld associated with the welding system of FIGS. 1 and 2 in accordance with another exemplary embodiment.

As noted above, the joint 130 in FIG. 2 is a right angled butt joint. However, FIGS. 4-7 are side cross-sectional views of other types of welds according to the system 100 and method 300 described above. Particularly, FIG. 4 illustrates an exemplary welding beam 400 produced by a welding gun properly aligned to weld the joint 430 between first and second work pieces 410, 420. The joint 430 in FIG. 4 is a tapered joint 430 in that the thickness at the root face 438 is greater than the thickness at the weld face 436. The beam 400 has sufficient width to join the edges 412, 422 across the joint 430 (e.g., a beam width greater than or equal to the thickness at the root face 438). A conventional system would likely not be able to access the root face, and thus, may not recognize the taper to result in an insufficient weld. FIG. 5 illustrates an exemplary welding beam 500 produced by a welding gun properly aligned to weld the joint 530 between first and second work pieces 510, 520. The joint 530 in FIG. 5 may be, for example, a fully penetrated groove weld joint 500. The beam 500 has sufficient width to join the edges 512, 522 across the joint 530. FIG. 6 illustrates an exemplary welding beam 600 produced by a welding gun properly aligned to weld the joint 630 between first and second work pieces 610, 620. The joint 630 in FIG. 6 may be, for example, a fillet weld joint 630, and the beam 600 has sufficient width and angle to join the edges 612, 622 across the joint 630. FIG. 7 illustrates an exemplary welding beam 700 produced by a welding gun properly aligned to weld the joint 730 between first, second, and third work pieces 710, 720, 725. The joint 730 in FIG. 7 may be, for example, an angled joint such as that required to couple turbine blades to compressor disks. The beam 700 has sufficient width, angle, and depth to join the three work pieces 710, 720, 725 at the joint 730.

Accordingly, exemplary embodiments may accommodate situations such as tolerance differences, excessive gap, edge break, and other anomalies such as misalignments that would otherwise result in beam deflection, cutting, or missed joint welds. Exemplary embodiments may also produce reliable, consistent, and reproducible welds, regardless of the machine or operator skill. The metal to metal joining requirements of the aerospace industry are particularly well suited to these systems and methods. Exemplary embodiments may be advantageously employed in a number of different types of material processing systems. Although an embodiment is described above with in reference to a welding system for welding two or more pieces of material together, it should be realized that the systems and methods described herein are not limited to such welding systems but may be advantageously employed in other systems, such as in material cutting systems, milling systems and other types of systems in which it is desirable to detect the position of a joint between two work pieces.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A welding system for welding a first work piece to a second work piece at a joint having a weld face and a root face, the welding system comprising:
   a weld face sensor configured to determine first joint characteristics at the weld face;
   a root face sensor configured to determine second joint characteristics at the root face;
   a controller coupled to the weld face sensor and the root face sensor and configured to generate positioning signals based on the first joint characteristics and the second joint characteristics; and
   a welding gun coupled to the controller and positioned proximate to the weld face, the welding gun configured to generate a welding beam for welding the joint based on the positioning signals from the controller,
   wherein the weld face sensor is positioned on a first side of the joint at the weld face and the root face sensor is positioned on a second side of the joint at the root face.

2. The welding system of claim 1, wherein the first joint characteristics include a weld face joint thickness.

3. The welding system of claim 1, wherein the second joint characteristics include a root face joint thickness.

4. The welding system of claim 1, wherein the positioning signals include weld beam thickness.

5. The welding system of claim 1, wherein the positioning signals indicate a lateral position of the joint.

6. The welding system of claim 1, wherein the positioning signals indicate an angle of the joint from the weld face to the root face.

7. The welding system of claim 1, further comprising a welding support coupled to the controller and the welding gun and configured to manipulate the welding gun to track the joint based on the positioning signals from the controller.

8. The welding system of claim 1, wherein the weld face sensor is an eddy current sensor.

9. The welding system of claim 1, wherein the root face sensor is an eddy current sensor.

10. A system for tracking a joint extending from a first face of a work piece to a second face of the work piece, comprising:
    a first sensor configured to generate first joint characteristics of the joint at the first face;
    a second sensor configured to generate second joint characteristics of the joint at the second face; and
    an encoder coupled to the first sensor and the second sensor and configured to determine a joint position based on the first joint characteristics and the second joint characteristics,
    wherein the first sensor and the second sensor are eddy current sensors, and
    wherein the encoder is further configured to determine a joint taper based on the first joint characteristics and the second joint characteristics,
    wherein the first sensor is a weld face sensor and the second sensor is a root face sensor, and wherein the first face is a weld face and the second face is a root face, and
    wherein the weld face sensor is positioned on a first side of the joint at the weld face and the root face sensor is positioned on a second side of the joint at the root face.

11. The system of claim 10, wherein the encoder is further configured to determine a joint angle based on the first joint characteristics and the second joint characteristics.

12. A method for tracking a joint extending between first faces of work pieces to second faces of the work pieces, comprising the steps of:
    determining, with a first sensor, first joint characteristics of the joint at the first faces;
    determining, with a second sensor, second joint characteristics of the joint at the second faces;
    evaluating joint geometry based on the first joint characteristics and the second joint characteristics; and
    welding the joint based on the evaluated joint geometry,
    wherein the joint is a weld joint, the first faces form a weld face, and the second faces form a root face, and
    wherein the step of determining first joint characteristics includes determining a weld face thickness and the step of determining second joint characteristics includes determining a root face thickness.

13. The method of claim 12, further comprising the step of comparing the weld face thickness to the root face thickness.

14. The method of claim 12, further comprising the step of comparing the weld face thickness and the root face thickness to a predetermined value.

15. The method of claim 14, further comprising the step of rejecting the joint when the weld face thickness or the root face thickness exceeds the predetermined value.

16. The method of claim 12, wherein the step of determining first joint characteristics includes determining weld face positional coordinates and the step of determining second joint characteristics includes determining root face positional coordinates.

17. The method of claim 16, further comprising the step of comparing the weld face positional coordinates to the root face positional coordinates, and evaluating a joint angle based on the comparison.

* * * * *